United States Patent
Nagai et al.

(10) Patent No.: US 6,964,083 B2
(45) Date of Patent: Nov. 15, 2005

(54) CASTER FOR BABY CARRIAGE

(75) Inventors: Tsutomu Nagai, Tokyo-To (JP);
Yoshiyuki Suzuki, Tokyo-To (JP)

(73) Assignee: Combi Corporation, Tokyo-to (JP)

( * ) Notice: Subject to any disclaimer, the term of this patent is extended or adjusted under 35 U.S.C. 154(b) by 0 days.

(21) Appl. No.: 10/204,050

(22) PCT Filed: Feb. 19, 2001

(86) PCT No.: PCT/JP01/01170

§ 371 (c)(1),
(2), (4) Date: Aug. 16, 2002

(87) PCT Pub. No.: WO01/60636

PCT Pub. Date: Aug. 23, 2001

(65) Prior Publication Data

US 2003/0019076 A1 Jan. 30, 2003

(30) Foreign Application Priority Data

Aug. 17, 2000 (JP) ........................ 2000-039380

(51) Int. Cl.$^7$ .............................................. B60B 33/02
(52) U.S. Cl. ...................................... 16/35 R; 280/647
(58) Field of Search ................................ 280/642, 647, 280/650, 657, 43, 47.38; 16/18 R, 35 R, 35 D, 44

(56) References Cited

U.S. PATENT DOCUMENTS

| | | | | |
|---|---|---|---|---|
| 2,709,827 A | * | 6/1955 | Volz ............................... 16/33 |
| 3,194,578 A | * | 7/1965 | Kiecker ..................... 280/80.1 |
| 4,138,131 A | * | 2/1979 | Sommer ...................... 280/220 |
| 4,246,677 A | * | 1/1981 | Downing et al. ........... 16/35 R |
| 4,280,246 A | * | 7/1981 | Christensen ................ 16/35 D |
| 4,385,414 A | * | 5/1983 | Damico ...................... 16/35 R |
| 4,399,587 A | * | 8/1983 | Penifaure ................... 16/35 D |
| 4,773,124 A | | 9/1988 | Nakao et al. ................ 16/35 R |
| 4,845,805 A | * | 7/1989 | Kassai ......................... 16/35 R |
| 5,172,451 A | * | 12/1992 | Chiu ........................... 16/35 R |
| 5,191,675 A | * | 3/1993 | Ishikura ...................... 16/35 R |
| 5,975,546 A | * | 11/1999 | Strand .................... 280/87.042 |
| 6,212,733 B1 | * | 4/2001 | Yeh ............................. 16/35 R |

FOREIGN PATENT DOCUMENTS

| | | |
|---|---|---|
| JP | 4-57402 | 5/1992 |
| JP | 63-61601 | 3/1998 |
| WO | 99/44461 | 9/1999 |

* cited by examiner

Primary Examiner—Frank Vanaman
(74) Attorney, Agent, or Firm—Wenderoth, Lind & Ponack, L.L.P.

(57) ABSTRACT

A caster for a baby carriage is composed of: a caster holder mounted to a front leg of a baby carriage; a caster column provided at the caster holder and having a flange-shaped portion at its lower end, wherein the caster bearing member is slidably and rotatably mounted relative to the caster column and supports a front wheel at one side. Tapered surfaces that are inclined toward a circumferential direction and engage each other are provided on a top surface of the flange-shaped portion of the caster column and a downwardly directed surface of the caster bearing member, respectively. A spring is provided between the caster holder and the caster bearing member to force the caster bearing member in a direction toward the flange-shaped portion of the caster column.

17 Claims, 9 Drawing Sheets

CASTER FOR BABY CARRIAGE

FIELD OF THE INVENTION

This invention relates to a caster for a baby carriage and more particularly to a caster for a front wheel of a baby carriage.

BACKGROUND OF THE INVENTION

Baby carriages are generally used to take out babies/children to the outdoors for a walk, shopping, and the like. Various baby carriages to easily fold up, store and carry, are proposed and put into practical use.

FIG. 11 is a perspective view of a baby carriage that can be folded up as mentioned above. This baby carriage 10 comprises a pair of left and right front legs 12 that have front wheels 11, a pair of left and right rear legs 14 that have rear wheels 13, a hand-pushing rod 15 that is bent to a nearly U-shape, a pair of left and right arm rests 16, and a detachable guard arm 17 that is placed across both arm rests 16 and 16. One end of each arm rest 16 is fitted to a portion near an end of left and right pipes 18 of the hand-pushing rod 15, and a top and of each front leg 12 is fitted to another end of each arm rest 16. Top ends of the left and right rear legs 14 are also fitted to intermediate portions of the arm rests 16, respectively. One end of a bracket 19 that is bent in a dog leg shape is fitted to an intermediate portion of a corresponding rear leg 14. The ends of the left and right pipes 19 of the hand-pushing rod 15 are fitted to intermediate positions of the brackets 19. When the baby carriage is unfolded, lock members 20 installed movably at the lower ends of the pipes 18 engage with engaging portions formed at other ends of the brackets 19 and an unfolded state is maintained.

On the other hand, the left and right front legs 12 are connected with a front side connecting bar 21, and the left and right rear legs 14 are connected with a rear side connecting bar 22. Further, a front end of a connecting bar 23 is fitted to an intermediate portion of a corresponding front leg 12, and a rear end of this connecting bar 23 is fitted to an end of a corresponding pipe 18 together with a corresponding bracket 19. Further, an upper side connecting bar 24 is connected to intermediate portions of left and right connecting bars 23.

As illustrated in FIG. 11, when the locking members 20 provided at the lower ends of the pipes 18 are engaged with the engaging portions provided at the upper ends of the brackets 19, the baby carriage is held in a usable unfolded state. On the other hand, when the locking members 20 are disengaged from the brackets 19 by operating an operating device 25 provided at the hand-pushing rod 15, the arm rests 16 and the connecting bars 23 became movable upwardly from the pipes 18 and connecting points, and the front legs 12 and the rear legs 14 are moved almost in parallel with each other and the baby carriage can be folded to be easily carried.

The hand-pushing rod 15, the front side connecting bar 21, the rear side connecting bar 22 and the upper side connecting bar 24 can be folded by joints at two points of intermediate portions in two vertical surfaces. When the left and right pipes 18 are moved forwardly after folding the front legs 12 and the rear legs 14 in a parallel state as described above, the hand-pushing rod 15, the front side connecting bar 21, the rear side connecting bar 22 and the upper side connecting bar 24 are turned forwardly and the baby carriage can be folded more compactly as illustrated in FIG. 12.

In other words, the baby carriage can be folded into three parts. Additionally, casters of a conventional baby carriage are normally used in a "Caster Free" state to turn around caster columns by 360°. Accordingly, when folding the baby carriage as described above, it is necessary to fold the baby carriage after returning directions of the casters to straight advancing positions and locking the casters in the straight advancing positions by locking devices.

However, it is troublesome to operate casters and locking devices with a hand and/or a foot whenever folding the baby carriage. The baby carriage might be so far folded by force without returning the casters to the straight advancing positions, thus causing not only breakage of the baby carriage but also a baby carriage that looks poor when folded.

SUMMARY OF THE INVENTION

In view of the points described above, it is an object of this invention to provide a caster for a baby carriage that returns automatically to a straight advancing position, from any rotary position, when holding a baby carriage body.

A caster for a baby carriage of the present invention comprises: a caster holder; a caster bearing member slidably and rotatably attached to the caster holder; a wheel rotatably attached to the caster bearing member; and a wheel straight advancing state position fixing device provided between the caster holder and the caster bearing ember to return and fix the wheel to a straight advancing position when it is lifted.

In accordance with a first embodiment, the caster for a baby carriage of the present invention is characterized in that the wheel straight advancing state position fixing device comprises a caster column provided at the caster holder and has a flange-shaped portion at a lower end thereof, and also has a downwardly directed surface of the caster bearing member that engages with an upper surface of the flange-shaped portion.

In accordance with the first embodiment, the caster for a baby carriage of the present invention is characterized in that the upper surface of the flange-shaped portion and the downwardly directed surface of the caster bearing member are provided with tapered surfaces which are inclined toward a circumferential direction and engage with each other.

In accordance with the first embodiment, the caster for a baby carriage of the present invention is characterized in that a spring is provided between the caster holder and the caster bearing member to force the caster bearing member against the flange-shaped portion of the caster column.

In accordance with the first embodiment, the caster for a baby carriage of the present invention is characterized in that the tapered surfaces provided on the upper surface of the flange-shaped portion and the downwardly directed surface of the caster bearing member are inclined symmetrically with respect to a longitudinal axis of the baby carriage.

In accordance with the first embodiment, the caster for a baby carriage of the present invention is characterized in that a cushion material is provided between the caster holder and the spring.

In accordance with a second embodiment, the caster for baby carriage of the present invention is characterized in that an additional spring is provided between the caster holder and the caster bearing member so as to serve as a wheel buffer.

In accordance with any of the first and second embodiments, the caster for a baby carriage of the present invention is characterized in that the caster column is formed integrally with the caster holder.

In accordance with a third embodiment, the caster for a baby carriage of the present invention is characterized in that the wheel straight advancing state position fixing device comprises a caster column that is provided at a caster holder and has a rotary roller attached to a lower end thereof, and also has a downwardly directed surface of the caster bearing member that engages with the roller of the caster column.

In accordance with the third embodiment, the caster for a baby carriage of the present invention is characterized in that a tapered surface is provided on the downwardly directed surface of the caster bearing member, and the tapered surface is in contact with the roller and inclined in a circumferential direction.

In accordance with the third embodiment, the caster for a baby carriage of the present invention is characterized in that a spring is provided between the caster holder and the caster bearing member to force the caster bearing member against the roller.

In accordance with the third embodiment, the caster for a baby carriage of the present invention is characterized in that the tapered surface provided on the downwardly directed surface of the caster bearing member is inclined symmetrically with respect to a longitudinal axis of the baby carriage.

In accordance with the third embodiment, the caster for a baby carriage of the present invention is characterized in that a cushion material is provided between the caster holder and the spring.

In accordance with a fourth embodiment, the caster for a baby carriage of the third embodiment of the present invention is characterized in that an additional spring is provided between the caster holder and the caster bearing member so as to serve as a wheel buffer.

In accordance with any of the third and fourth embodiments, the caster for a baby carriage of the present invention is characterized in that the caster column is formed integrally with the caster holder.

In accordance with a fifth embodiment, the caster for a baby carriage of the present invention is characterized in that the wheel straight advancing state position fixing device comprises a fixing pin provided to be movably outward in a radial direction at a caster bearing member, and a concave portion extending in a vertical direction on an inner surface of the caster holder for engaging with the fixing pin.

In accordance with the fifth embodiment, the caster for a baby carriage of the present invention is characterized in that the fixing pin is compressed outwardly in a radial direction by an elastic member.

In accordance with the fifth embodiment, the caster for a baby carriage of the present invention is characterized in that a circumferential groove having upper and lower stepped portions is provided on an outer surface of the caster bearing member, and a stop pin is provided for engaging with the upper and lower stepped portions in the circumferential groove of the caster bearing member.

DETAILED DESCRIPTION OF THE PREFERRED EMBODIMENTS

Hereinafter, preferred embodiments of the present invention will be described referring to FIG. 1 through FIG. 10.

Figure 1:
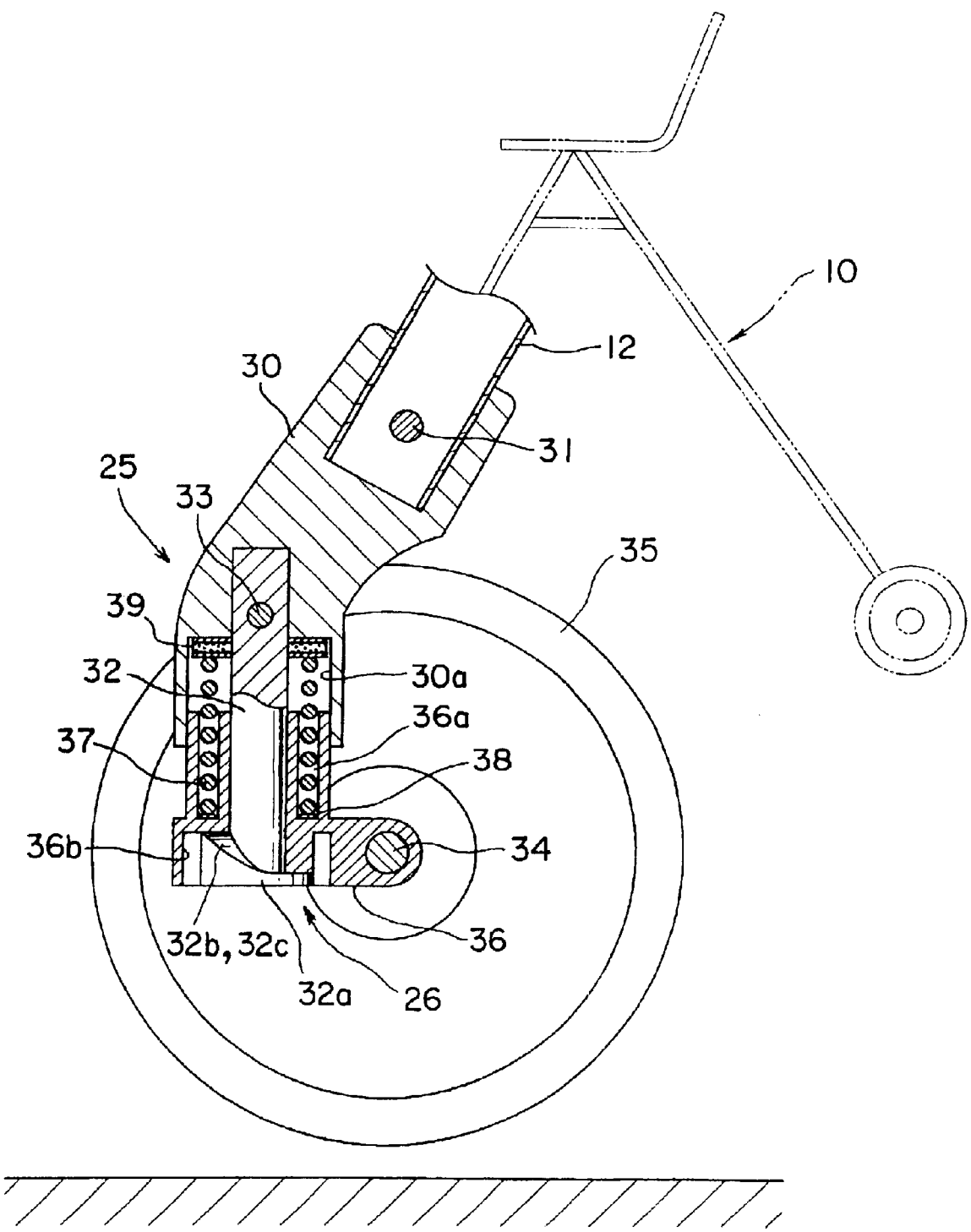
FIG. 1 is a sectional view showing a first embodiment of a caster for a baby carriage of the present invention.

FIG. 1 is a sectional view showing a first embodiment of a caster for a baby carriage of the present invention, and in FIG. 1, a caster holder 30 is fixed to a lower end of a front leg of a baby carriage 10 with a rivet 31. A lower half of the caster holder 30 is bent in a vertical direction, and a vertical portion of the holder 30 is formed. A column-shaped space 30a is formed at the vertical portion of the caster holder 30. A lower end of this space 30a opens downwardly. In this space 30a, a caster column 32 is provided concentrically with the space 30a and its top portion is inserted into the caster holder 30 and fixed thereto with a rivet 33.

A caster bearing member 36 supporting a front wheel 35 rotatably by a horizontal shaft 34 is installed on the caster column 32 rotatably around the caster column 32 and slidably between the caster column 32 and an inner surface defining the space 30a of the caster holder 30. At an upper part of the caster bearing member 36, a ring shape concave portion 36a is formed concentrically with the caster column 32. In this ring shape concave portion 36a, a spring 37 is arranged concentrically with the caster column 32 to force the caster bearing 36 downwardly. A washer 38 is provided between the spring 37 and a bottom surface of the ring shape concave portion 36a of the caster bearing member 36. Further, a cushion defined by a washer provided on both surfaces of a urethane-like elastic plate (i.e. cushion material 39) is provided between a top wall portion of the space 30a of the caster holder 30 and the spring 37.

At a lower end of the caster column 32, a flange-shaped portion 32a is formed, and this flange-shaped portion 32a is arranged in a concave portion 36b formed on a lower surface of the caster bearing member 36. On a ring shape top surface 32c of this flange shape portion 32a, a tapered surface 32b rising toward a circumferentially forward direction is formed symmetrically with respect to a longitudinal horizontal axis of the flange-shaped portion 32a.

On the other hand, a tapered surface 36c (FIG. 2) is formed on a downwardly directed surface 36d of the concave portion 36b of the caster bearing member 36, which tapered surface 36c opposes the tapered surface 32b of the flange-shaped portion 32a of the caster column 32. That is, the tapered surface 36c is formed on the downwardly directed surface 36d of the caster bearing member 36 rising in the circumferentially forward direction symmetrically with respect to the longitudinal horizontal axis.

Figure 2:
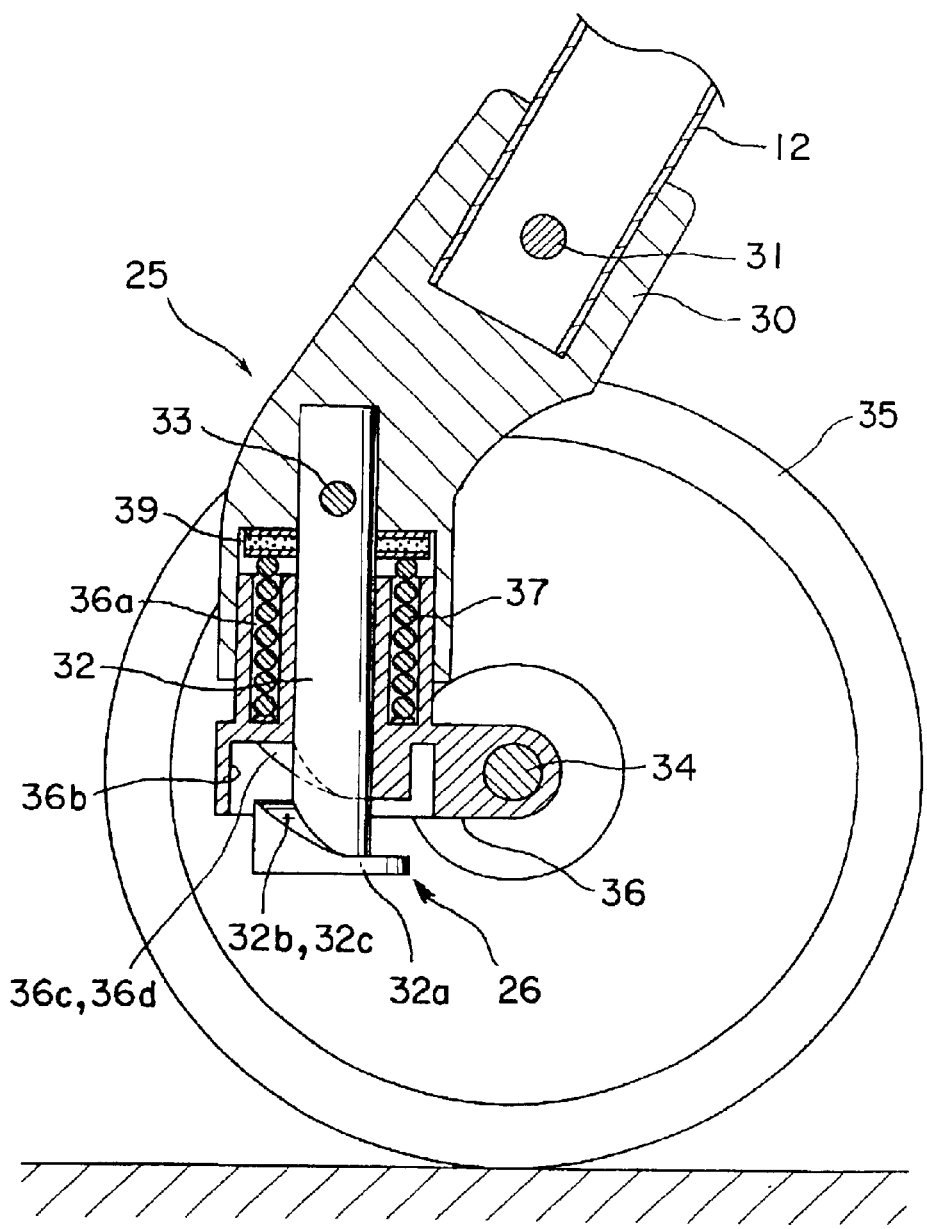
FIG. 2 is a sectional view showing a grounding state of the caster for a baby carriage shown in FIG. 1.

FIG. 2 is a view showing a state of the baby carriage when it is running, that is, a state of the caster where the front wheel 35 is in contact with the ground. When the front wheel 35 is in contact with the ground, the front leg 12 moves downwardly via weight of the baby carriage body. Accordingly, the caster column 32 also moves downwardly via the caster holder 30, and its flange portion 32a is projected almost downwardly from the concave portion 36b of the caster bearing member 36. Accordingly, the caster bearing member 36 is able to rotate around the caster column 32. When changing a moving direction of the baby carriage, the caster is able to turn properly and easily change the moving direction. In addition, vertical vibration caused by running of the wheel 35 is reduced by the spring 37 and the cushion material 39.

On the other hand, in a case where the baby carriage 10 is folded in order to hold and carry it, when the front wheel 35 is lifted from the ground by lifting the front leg 12 as illustrated in FIG. 1, the caster bearing member 36 is moved downwardly along the caster column 32 via the spring 37, and the tapered surface 36c formed on the downwardly directed surface 36d of the caster bearing member 36 comes into contact with the tapered surface 32b formed on the upper surface 32c of the flange-shaped portion 32a of the caster column 32. Therefore, the caster bearing maser 36 automatically rotates around the caster column 32 until the tapered surface 36c of the caster bearing member 36 and the tapered surface 32b of the caster column 32 are completely fitted, and the caster bearing member 36 is fixed at a straight advancing position.

Figure 3:
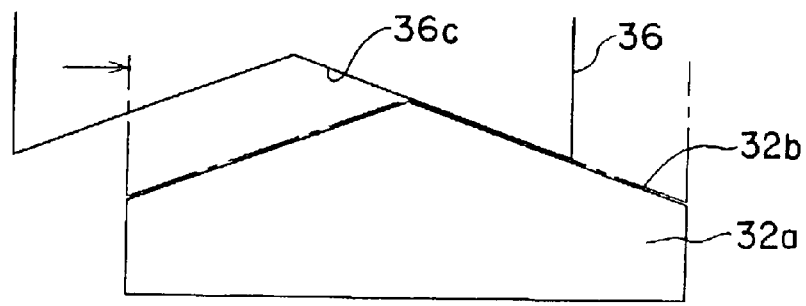
FIG. 3 is a diagram for explaining operation of a caster bearing member.

FIG. 3 is a diagram of the tapered surfaces 36c, 32b of the caster bearing member 36 and the caster column 32.

After the tapered surface 36c of the caster bearing member 36 and the tapered surface 32b of the flange shape portion 32a of the caster column 32 are partially in contact with each other (shown by the solid line), the caster bearing member 36 moves downwardly while rotating in the direction of an arrow by inclination of the tapered surfaces 36c and 32b, and is fixed in a state moved to a position of a one-dot chain line, and fixed at this position, as shown in FIG. 3. That is, the caster bearing member 36 returns to the straight advancing position automatically and is fixed there.

Accordingly, when folding the baby carriage 10, the baby carriage will not be folded by force in a state where the front wheel 35 supported by the caster bearing member 36 is not in the straight advancing position.

In the construction described above, a wheel straight advancing state position fixing device 26 is composed of the caster column 32 provided at the caster holder 30 and having the flange-shaped portion 32a and the downwardly directed surface 36d of the caster bearing member 36 that engages with the upper surface 32c of the flange-shaped portion 32a. Further, this wheel straight advancing state position fixing device 26, the caster holder 30, the caster bearing member 36 and the front wheel 35 comprise the caster for a baby carriage of the present invention.

Figure 4:
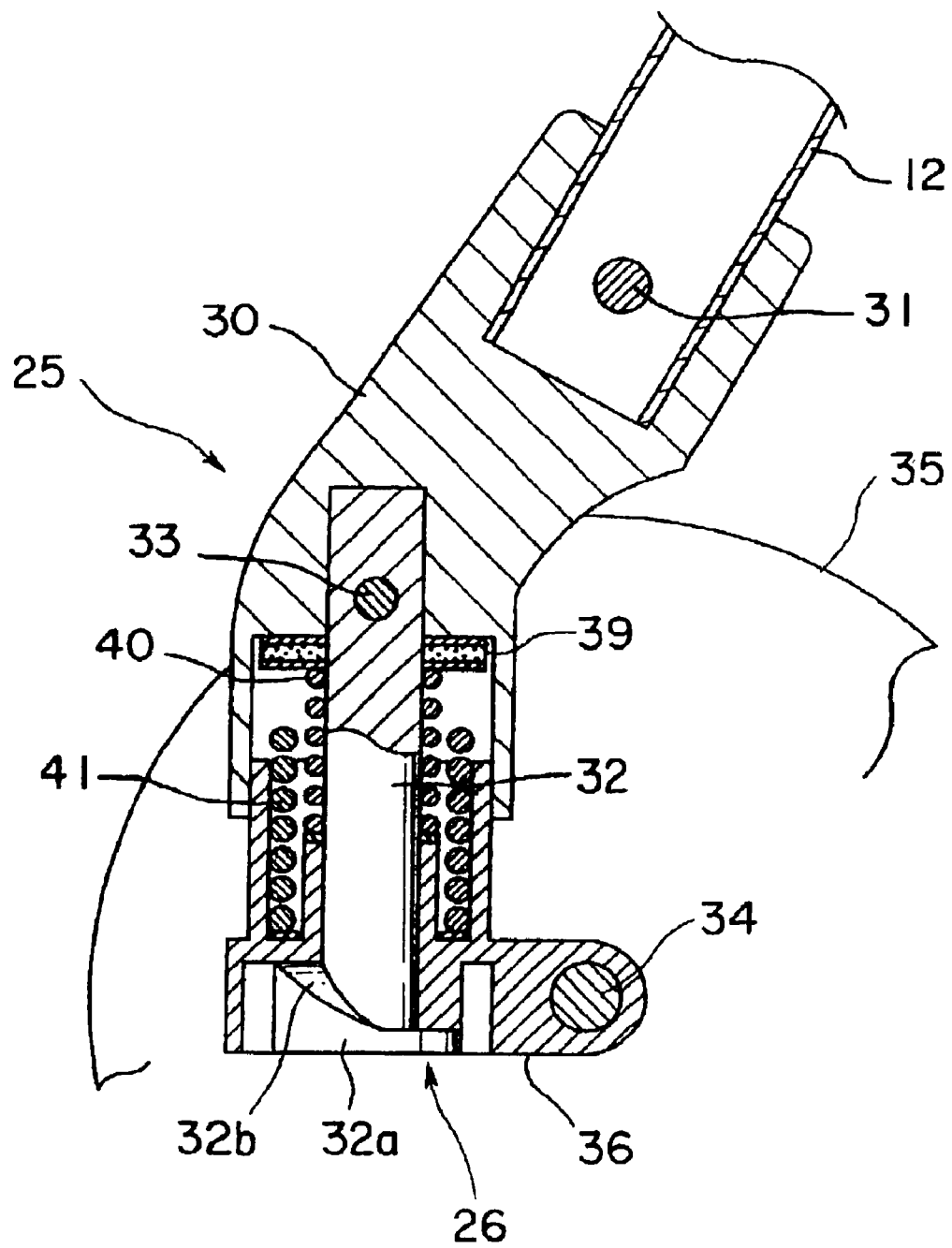
FIG. 4 is a sectional view showing a second embodiment of the caster for a baby carriage of the present invention.

FIG. 4 is a view showing a second embodiment of the present invention. In this embodiment, a first spring 40 for pressing and rotating caster bearing member 36 relative to flange-shaped portion 32a of caster column 32, and a second spring (an additional spring) for serving as a buffer of front wheel 35 are provided, and all other elements are the same as those shown in FIG. 1 and FIG. 2.

In this case, the first spring 40 for rotating the caster bearing member 36 can be a spring having a relatively weak spring force because a load is small, and the second spring 41 can act only after the front wheel 35 is brought into contact with the ground and the flange-shaped portion 32a of the caster column 32 is disengaged from the caster bearing member 36. Thus, when moving a baby carriage, the caster bearing member 36 and the flange shape portion 32a of the caster column 32 are disengaged completely, a direction changing property of the front wheel 35 is not impaired, and traveling efficiency of a baby carriage can be prevented from becoming worse.

Figure 5:
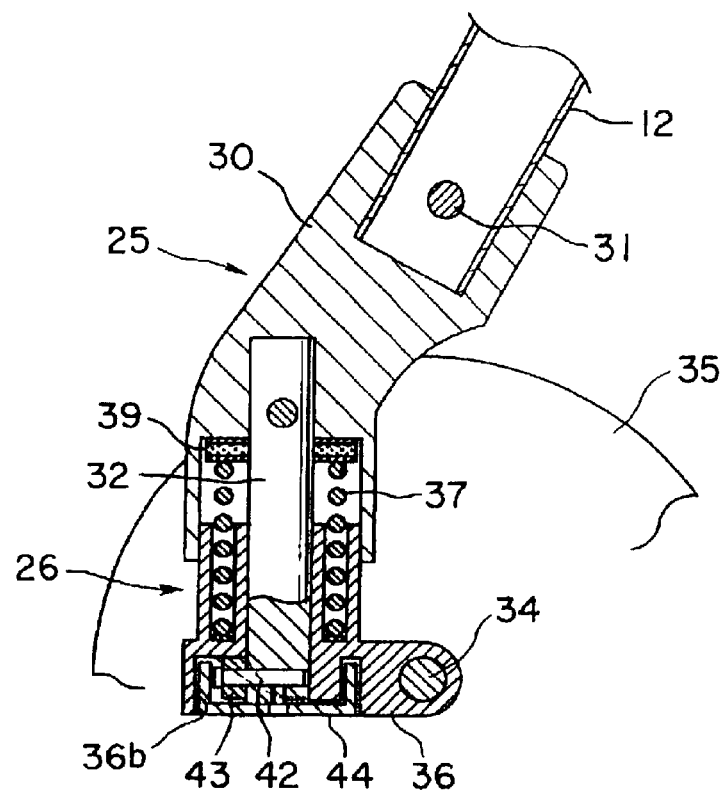
FIG. 5 is a sectional view showing a third embodiment of the caster for a baby carriage of the present invention.

FIG. 5 is a view showing a third embodiment of the present invention. A roller 43 is rotatably attached to a horizontal shaft 42 instead of providing a flange-shaped portion attached to caster column 32. A caster cover 44 is attached to a lower end of the caster column 32 for blocking an opening of concave portion 36b of caster bearing member 36. All other elements are the same as the embodiment shown in FIG. 1 and FIG. 2.

In this third embodiment, as the roller 43 rotates relative to tapered surface 36c of the caster bearing member 36, relative movement between the caster column 32 and the caster bearing member 36 is very smooth and an inclined angle of the tapered surface 36c can be smaller than that of the first embodiment, and a height of the caster bearing member 36 can be smaller accordingly.

In FIG. 5, wheel straight advancing state position fixing device 26 is composed of the caster column 32 equipped with the roller 43 and downwardly directed surface 36d of the caster bearing member 36 that engages with the roller 43.

Figure 6:
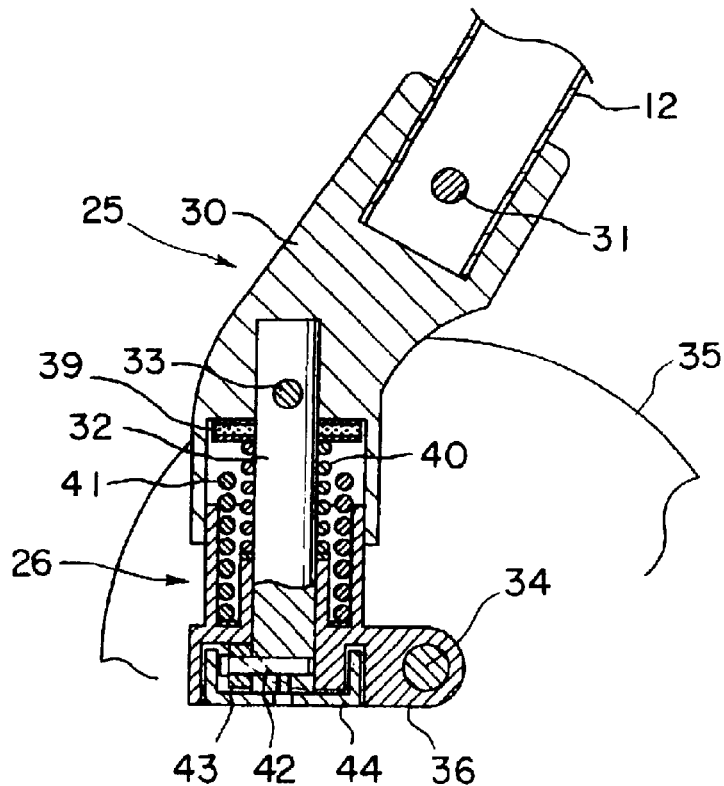
FIG. 6 is a sectional view showing a fourth embodiment of the caster for a baby carriage of the present invention.

FIG. 6 is a view showing a fourth embodiment of the present invention, and is similar to that shown in FIG. 4. In FIG. 6, first spring 40 for rotating caster bearing member 36 and second spring 41 for buffering wheel 35 are provided. Other elements are the same as those shown in FIG. S.

Figure 7:
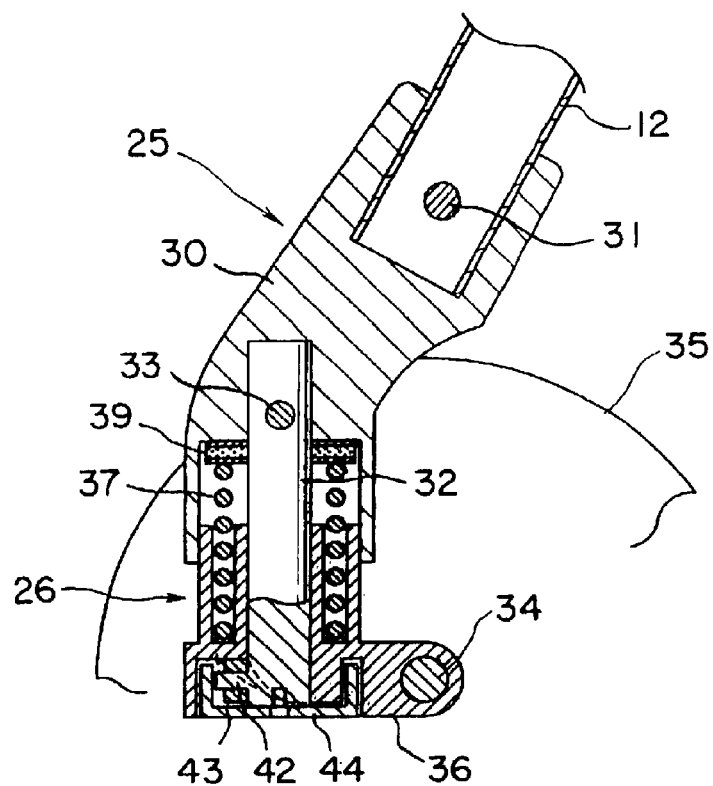
FIG. 7 is a sectional view showing a modification of the third embodiment of the caster for a baby carriage of the present invention.
Figure 8:
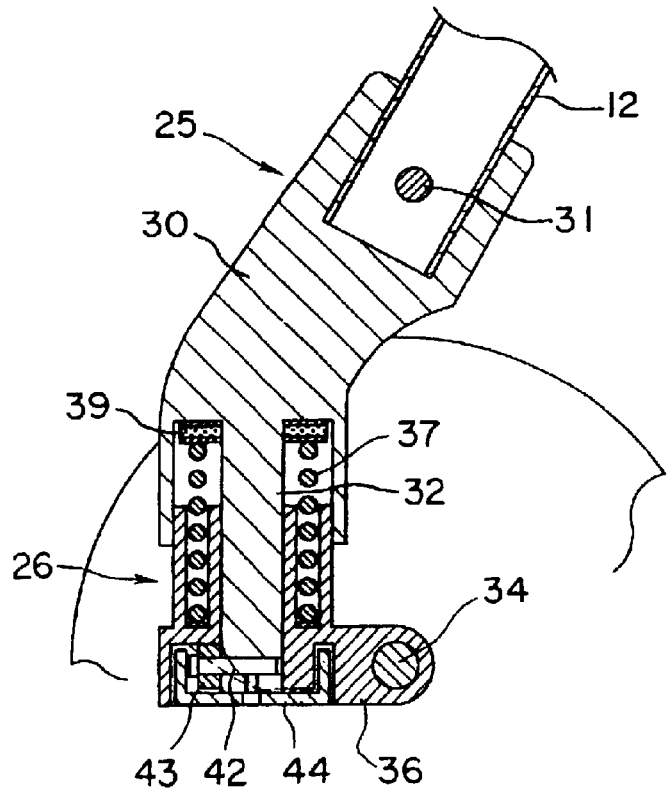
FIG. 8 is a sectional view showing a modification of the third embodiment of the caster for a baby carriage of the present invention.

FIG. 7 is a view showing a fifth embodiment of the present invention, and horizontal axis 42 supporting roller 43 is formed integrally with caster column 32. In this embodiment, the number of parts can be reduced compared with that shown in FIG. 5, and the number of assembling steps can also be reduced.

In the embodiments described above, caster column 32 fixed to caster holder 30 is shown; however, the caster column 32 may be formed integrally with the caster holder 30 as shown in FIG. B. In this case, it is not required to fix the caster column 32 to the caster holder 30 and the number of assembling steps can be reduced and the number of parts also can be reduced accordingly.

Figure 9:
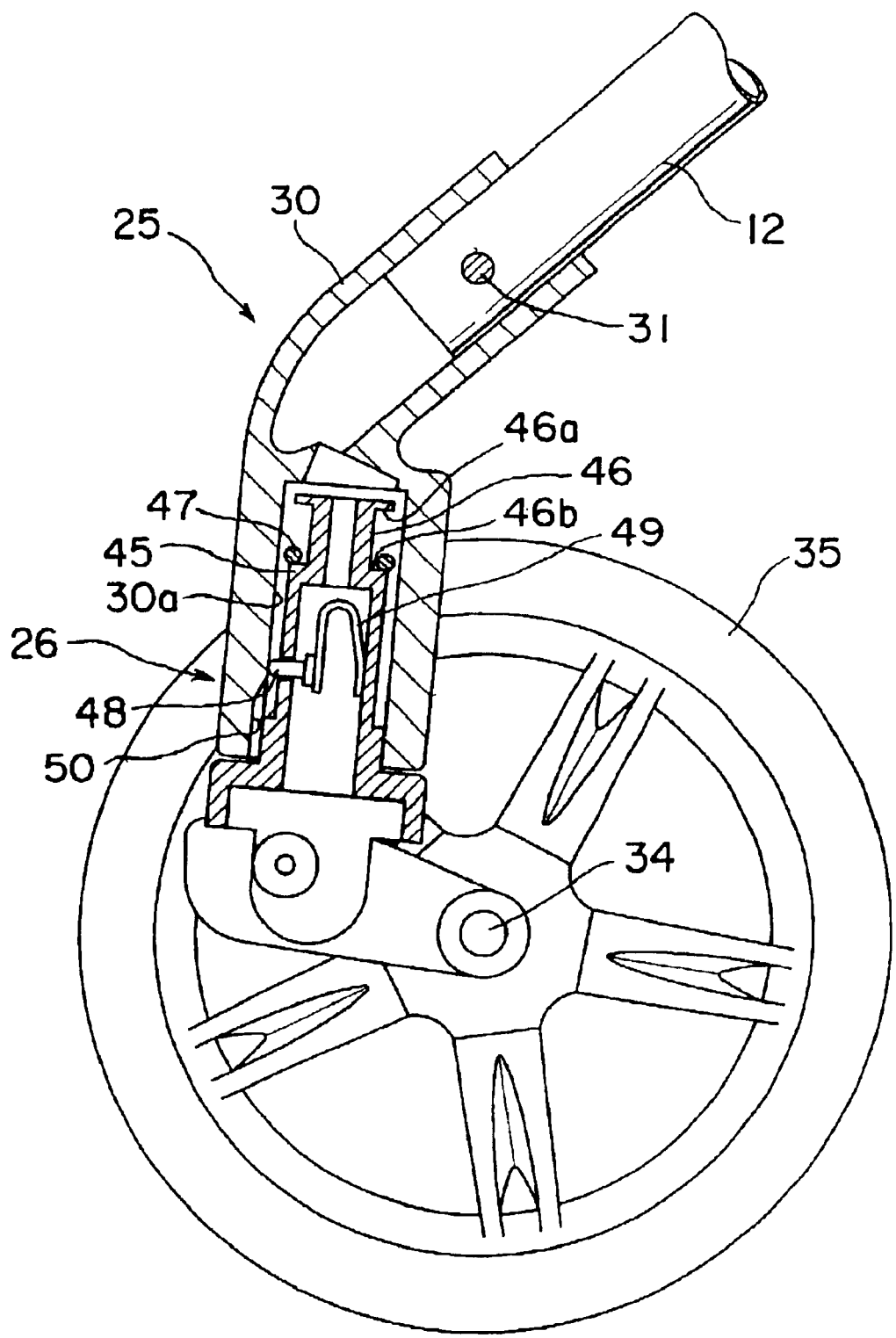
FIG. 9 is a sectional view showing a fifth embodiment of the caster for a baby carriage of the present invention.

FIG. 9 is a view showing a sixth embodiment of the present invention. In caster holder 30 fixed to a lower end of front leg 12, a column shape space 30a whose lower end is opened, is formed. In this space 30a, a caster bearing her 45 supporting front wheel 35 by horizontal axis 34 is mounted so that the caster bearing member 45 can rotate around its axis and slide along an inner surface defining the space 30a.

On a top outer surface of the caster bearing member 45, a circumferential groove 46 is provided. A stop pin 47 is provided in the circumferential groove 46 and extends in a horizontal direction. A sliding range in upper and lower directions of the caster bearing member 45 is defined by engaging this stop pin 47 with upper and lower stepped portions 46a, 46b defining the circumferential groove 46. The caster bearing member 45 is provided with a front straight advancing position fixing pin 48 that is able to move forward/backward in a radial direction of the caster bearing member 45. This pin 48 is compressed so as to project to an exterior by a spring 49 mounted in the caster bearing member 45.

On the other hand, a concave groove 50 is provided at a lower position on a lower inner surface defining the space 30a of the caster holder 30. The fixing pin 48 is engaged with this groove when the caster bearing member 45 and the front wheel 35 are lowered and the front wheel 35 is set in a straight advancing direction. This concave groove 50 extends in an axial direction and an upper end portion of the concave groove 50 is inclined toward an inner surface side of the space 30a of the caster holder 30.

When the baby carriage is used, the front wheel 35 is in contact with the ground, and therefore the front leg 12 is moved downwardly; that is, the caster bearing member 45 is at a relatively higher position with respect to the caster holder 30. Therefore, the fixing pin 48 is in contact with the inner surface defining the space 30a and therefore able to rotate within the space as shown in FIG. 9.

On the other hand, when the front wheel 35 is raised upwardly by a hand-pushing rod when folding the baby carriage, the front wheel 35 moves downwardly, by its weight together with the caster bearing member 45, with respect to the caster holder 30. Accordingly, when the front wheel 35 is moved in the straight advancing direction, the fixing pin 48 is projected by the spring 49, engages with the concave groove 50 and is fixed in a state facing the straight advancing direction. Therefore, the front wheel 35 supported by the caster bearing member 45 is prevented from being folded up by force when it is not in a straight advance position.

Figure 10:
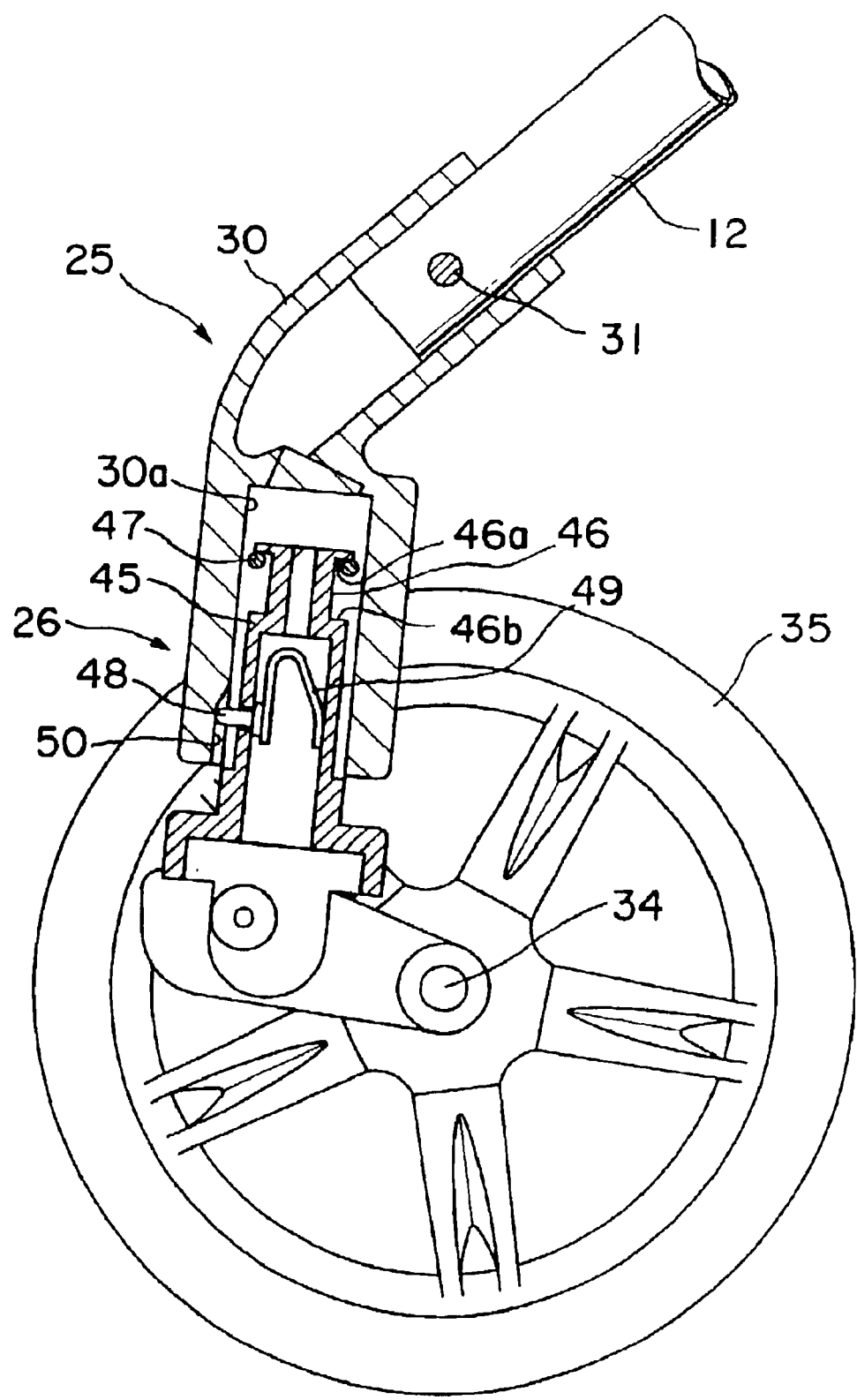
FIG. 10 is a diagram for explaining operation of the embodiment shown in FIG. 9.
Figure 11:
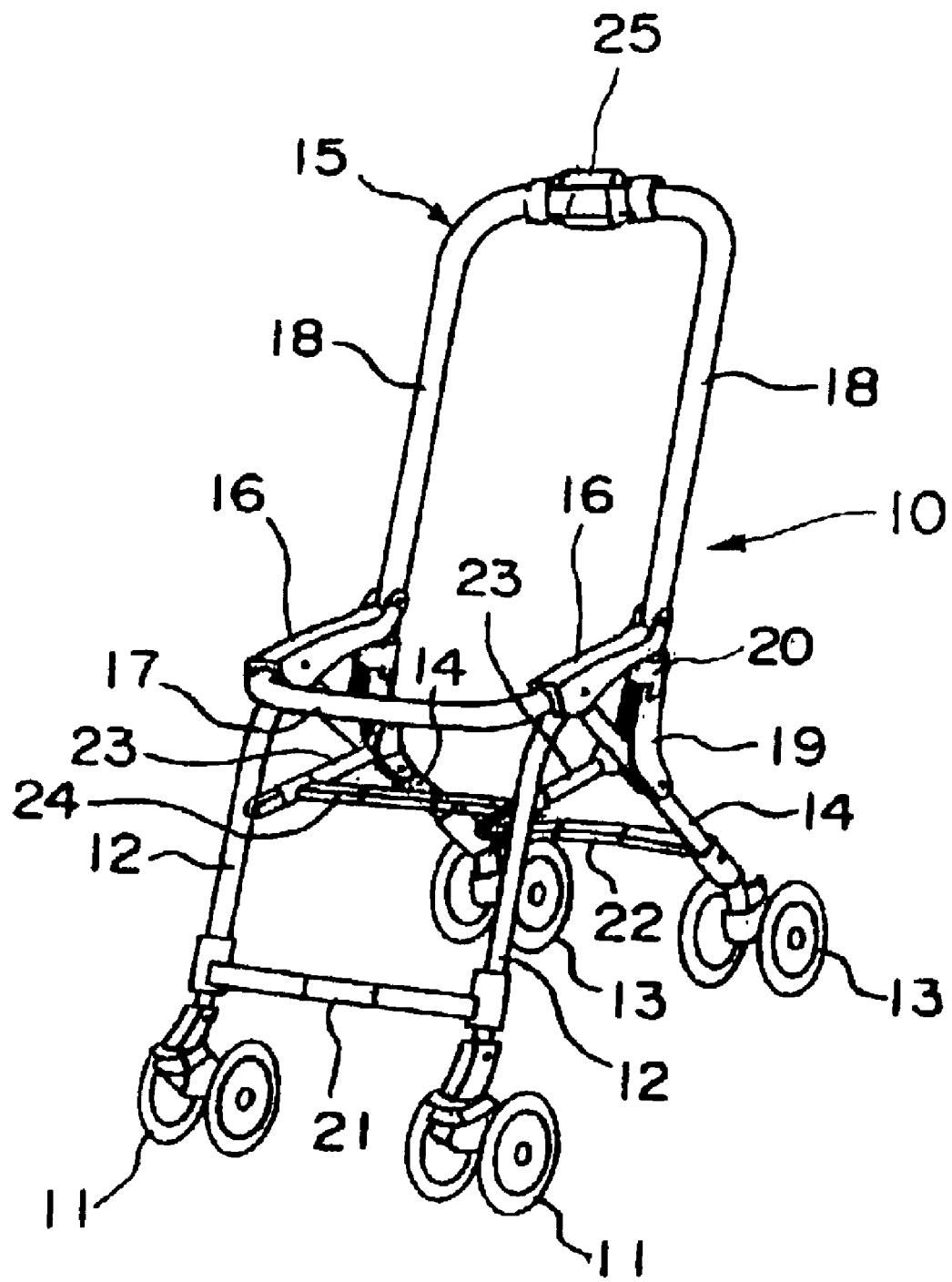
FIG. 11 is a perspective view showing a structure of the baby carriage.
Figure 12:
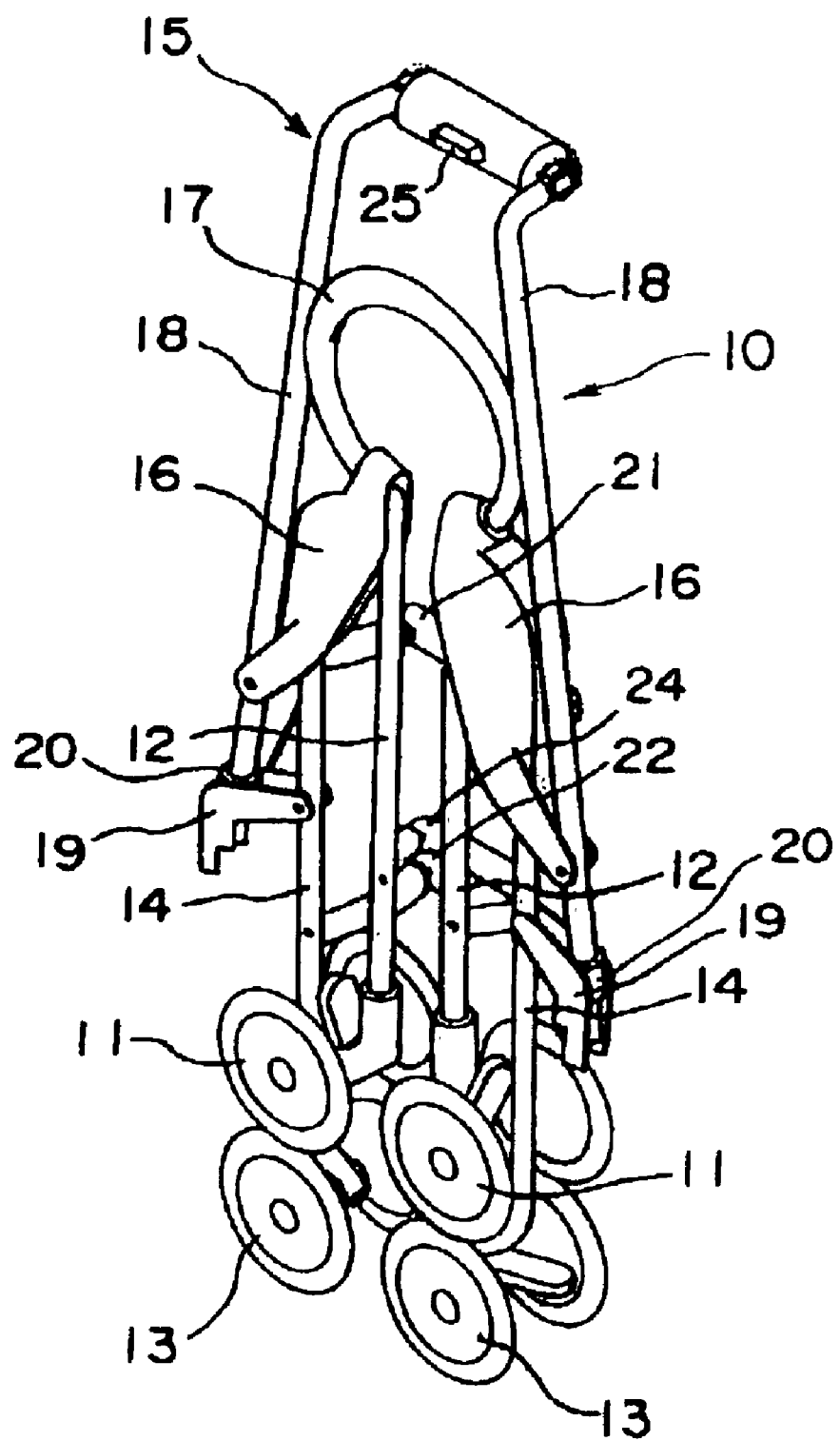
FIG. 12 is a perspective view showing a folded state of the baby carriage.

In FIG. 9 and FIG. 10, wheel straight advancing position fixing device 26 is composed of the fixing pin 48 provided at the caster bearing member 45, and the concave groove 50 formed on the inner surface of the caster holder 30.

As a caster for a baby carriage caster of the present invention is constructed as described above, when the caster is raised from the ground, a caster bearing member moves automatically from any rotary position to a straight advancing position and is fixed there, and the baby carriage will not be folded with a wheel directed in an unspecified direction when folding the baby carriage. Thus, breakage of the caster is prevented. Furthermore, a troublesome handling such as adjusting direction of the wheel by hands is not required. In addition, it is not required to provide a locking device for fixing a direction of the wheel, therefore the number of parts can be reduced and assembling steps of the caster can be easier.

What is claimed is:

1. A caster for a baby carriage comprising:
   a caster holder provided on the baby carriage;
   a caster bearing member slidably and rotatably attached to said caster holder;
   a wheel rotatable attached to said caster bearing member; and
   a wheel straight advancing position fixing device, provided between said caster holder and said caster bearing member, for causing said caster bearing member to move downwardly and rotate with respect to said caster holder so as to return and fix said wheel to a straight advancing position when said wheel is lifted, wherein said wheel straight advancing position fixing device includes a caster column that is provided at said caster holder and has a flange-shaped portion at a lower end of said caster column, and also includes a downwardly directed surface of said caster bearing member that engages with an upper surface of said flange-shaped portion.

2. The caster for a baby carriage according to claim 1, wherein said upper surface of said flange-shaped portion is tapered, and said downwardly directed surface of said caster bearing member is tapered, with these tapered surfaces being inclined in a circumferential direction.

3. The caster for a baby carriage according to claim 2, further comprising:
   a spring between said caster holder and said caster bearing member so as to force said caster bearing member against said flange-shaped portion of said caster column.

4. The caster for a baby carriage according to claim 3, further comprising:
   a cushion material between said caster holder and said spring.

5. The caster for a baby carriage according to claim 3, further comprising:
   an additional spring between said caster holder and said caster bearing member to serve as a wheel buffer.

6. The caster for a baby carriage according to claim 2, wherein
   the tapered upper surface of said flange-shaped portion and the tapered downwardly directed surface of said caster bearing member are inclined symmetrically with respect to a longitudinal axis of the baby carriage, respectively.

7. The caster for a baby carriage according to claim 1, wherein
   said caster column is formed integrally with said caster holder.

8. A caster for a baby carriage, comprising:
   a caster holder provided on the baby carriage;
   a caster bearing member slidably and rotatably attached to said caster holder;
   a wheel rotatable attached to said caster bearing member; and
   a wheel straight advancing position fixing device, provided between said caster holder and said caster bearing member, for causing said caster bearing member to move downwardly and rotate with respect to said caster holder so as to return and fix said wheel to a straight advancing position when said wheel is lifted, wherein said wheel straight advancing position fixing device includes a caster column that is provided at said caster holder and has a roller mounted at a lower end of said caster column, and also includes a downwardly directed surface of said caster bearing member that engages with said roller.

9. The caster for a baby carriage according to claim 8, wherein
   said downwardly directed surface of said caster bearing member is tapered, with the tapered surface being in contact with said roller and inclined in a circumferential direction.

10. The caster for a baby carriage according to claim 9, further comprising:
    a spring between said caster holder and said caster bearing member so as to force said the caster bearing member against said roller.

11. The caster for a baby carriage according to claim 10, further comprising:
    a cushion material between said caster holder and said spring.

12. The caster for a baby carriage according to claim 10, further comprising:

an additional spring between said caster holder and said caster bearing member to serve as a wheel buffer.

13. The caster for a baby carriage according to claim 9, wherein
the tapered downwardly directed surface of said caster bearing member is inclined symmetrically with respect to a longitudinal axis of the baby carriage.

14. The caster for a baby carriage according to claim 8, wherein
said caster column is formed integrally with said caster holder.

15. A caster for a baby carriage, comprising:
a caster holder provided on the baby carriage;
a caster bearing member slidably and rotatable attached to said caster holder;
a wheel rotatable attached to said caster bearing member; and
a wheel straight advancing position fixing device, provided between said caster holder and said caster bearing member, for causing said caster bearing member to move downwardly and rotate with respect to said caster holder so as to return and fix said wheel to a straight advancing position when said wheel is lifted, wherein
said wheel straight advancing position fixing device includes a fixing pin provided at said caster bearing member to move forward/backward in a radial direction, and also includes a vertically extending concave groove on an inner surface of said caster holder, with said fixing pin being engaged with said concave groove.

16. The caster for a baby carriage according to claim 15, further comprising:
an elastic member to exteriorly force said fixing pin in the radial direction.

17. The caster for a baby carriage according to claim 15, further comprising:
a circumferential groove defined by upper and lower stepped portions on an outer surface of said caster bearing member; and
a stop pin at said caster holder to engage with said upper and lower stepped portions.

* * * * *